July 3, 1945.  E. W. EWESON  2,379,629
DEVICE FOR MANIPULATING CONTACT LENSES
Filed Oct. 13, 1943
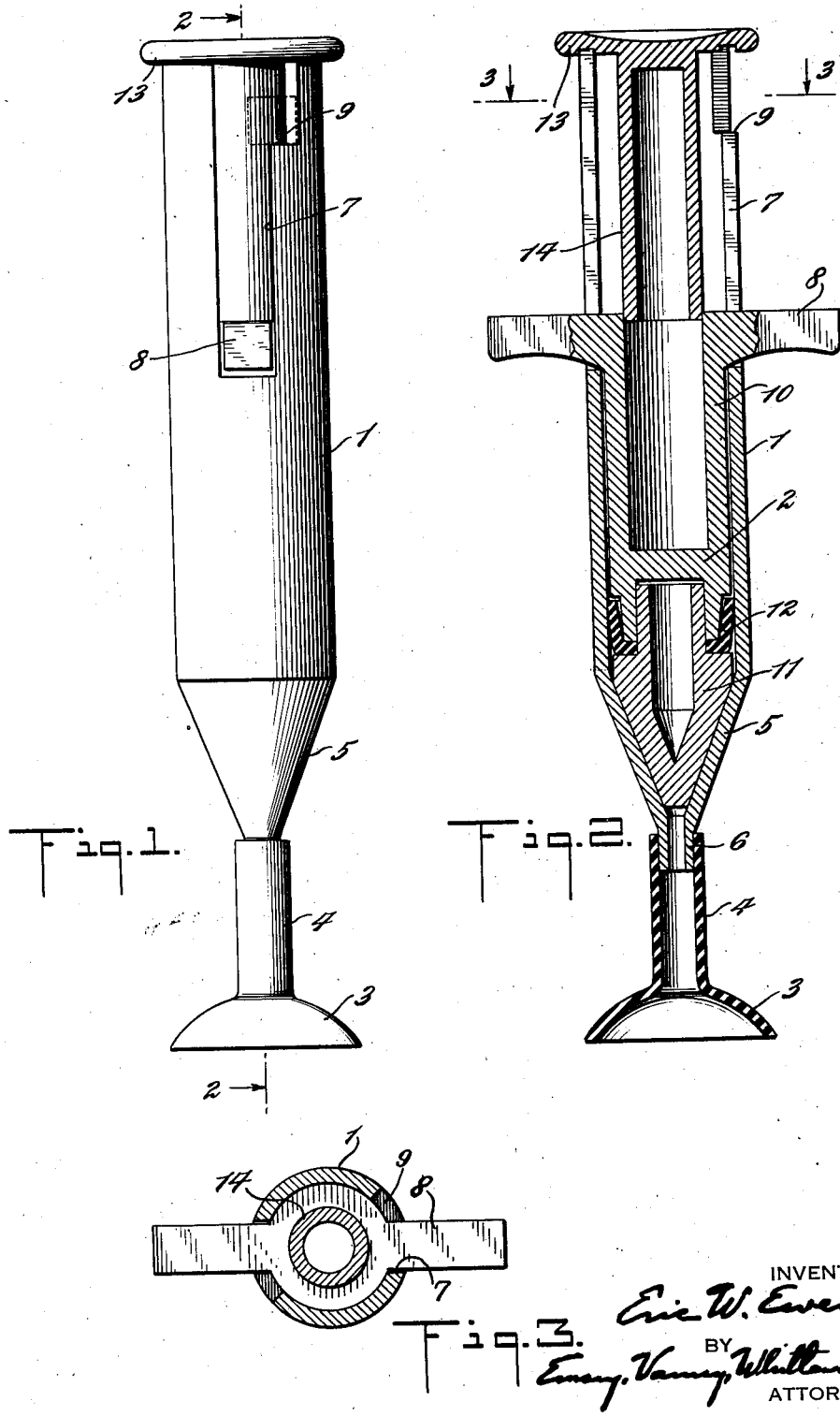
INVENTOR
Eric W. Eweson
BY
ATTORNEYS Patented July 3, 1945

2,379,629

UNITED STATES PATENT OFFICE 2,379,629

DEVICE FOR MANIPULATING CONTACT LENSES

Eric W. Eweson, New York, N. Y.

Application October 13, 1943, Serial No. 506,086

1 Claim. (Cl. 294—64)

This invention relates to devices for manipulating contact lenses, which said lenses are a variety of optical lenses shaped to the contour of the eyeball and worn in contact with the eyeball and held in place by the eyelids.

Heretofore it has been common practice to manipulate such lenses in inserting and removing them by means of a small rubber bulb having a suction cup surrounding the bulb orifice. Such bulbs have not been entirely satisfactory for a variety of reasons. For example, the suction provided by the bulb is very weak, and the lenses are frequently dropped and broken. Also, it is necessary to hold the bulb carefully to prevent loss of suction and this is frequently awkward while manipulating the lenses. If the suction is accidentally relaxed by slight squeezing of the bulb, of course, the grip on the lens may be lost. Also in removing a lens from the eye it has been found necessary to apply considerable pressure to insure an adequate suction grip on the lens which results in discomfort to the user.

It is an object of the present invention to provide a device which will provide a stronger suction grip on the lens, which will retain the suction during the manipulation, and which generally facilitates the manipulative operation.

Other objects and advantages of the invention will appear hereinafter.

A preferred embodiment of the invention selected for purposes of illustration is shown in the accompanying drawing, in which, Figure 1 is a side elevation.

Figure 2 is a vertical longitudinal section on the line 2—2 of Figure 1.

Figure 3 is a transverse section on the line 3—3 of Figure 2.

Referring to the drawing, the device comprises a suction pump consisting of a cylinder 1 and piston 2, by means of which suction may be created by operation of the piston, a suction cup 3, and a flexible tubular member 4 between the cylinder and the suction cup.

In the preferred embodiment illustrated the cylinder 1 is open at the top and tapers inwardly at 5 near the bottom, terminating in a small tubular tip 6 for connection to the flexible tubular member 4. The cylinder is provided with longitudinal slots 7 to receive and guide the projections 8 which extend outwardly from the piston, and by means of which the piston may be moved longitudinally of the cylinder to create or release the suction therein. Means are provided for locking the piston in suction creating position, such means comprising the shoulders 9 at the upper ends of the slots 7 which engage the projections 8 on giving the piston a slight turn at the end of its upward or suction creating stroke.

The piston 2 may be of any suitable construction, but preferably comprises a hollow barrel 10 and a head 11 between which a packing 12 may be secured. Said packing may be of any suitable flexible material such as rubber or leather, but I prefer to use a vinyl chloride resin for the purpose as such resins do not deteriorate when exposed to lubricant and I have found that they provide an extraordinarily tight seal. The head of the piston is preferably shaped to conform to the shape of the bottom of the cylinder, in this case being tapered, in order to substantially fill the space in the cylinder so as to displace air in the cylinder and increase the suction when the piston is moved upwardly.

The open upper end of the cylinder is closed by a cap 13 having a depending skirt 14 which fits into the hollow piston and serves as a guide therefor. The cap may be secured to the cylinder in any suitable manner and limits the upward movement of the piston.

The suction cup and flexible tubular member may be made of rubber or of any suitable flexible material such as vinyl chloride. Preferably the cup and tubular member are integral as shown. If desired, the suction cup may be made in the shape of an ellipse to facilitate insertion between the eyelids, particularly when removing a lens from the eye.

In operation, the suction cup is placed against the lens and the piston is moved upwardly in the cylinder and then turned slightly to lock it against the shoulders 9 which hold the piston against retraction under the influence of atmospheric pressure. Thus the user may hold the device during the manipulation of the lens in any convenient manner without having to apply manual pressure to restrain the piston. After the manipulation is completed, the piston is released and returned to release the suction.

In the manipulative operation, the flexible tubular connection between the cylinder and the suction cup is important, particularly when releasing the suction cup from the lens after placing the lens in the eye, or when attaching the suction cup to the lens preparatory to removing the lens from the eye. In both of these operations it is necessary to move the piston, and it is difficult to move the piston and at the same time hold the cylinder completely stationary. With the flexible connection, however, the cylinder may move without causing corresponding motion of the suction cup such as might cause discomfort to the eye.

It will be understood that the invention may be variously modified and embodied within the scope of the subjoined claim.

I claim as my invention:

A device for manipulating contact lenses which comprises a cylinder and piston, said cylinder having longitudinal slots and said piston having projections extending through said slots, said slots having shoulders adapted to engage said projections to lock said piston at the end of its suction creating stroke.

ERIC W. EWESON.